No. 774,727. PATENTED NOV. 8, 1904.
L. T. PETERSEN.
PROCESS OF RECLAIMING AND REGENERATING RUBBER.
APPLICATION FILED JUNE 24, 1904.
NO MODEL.
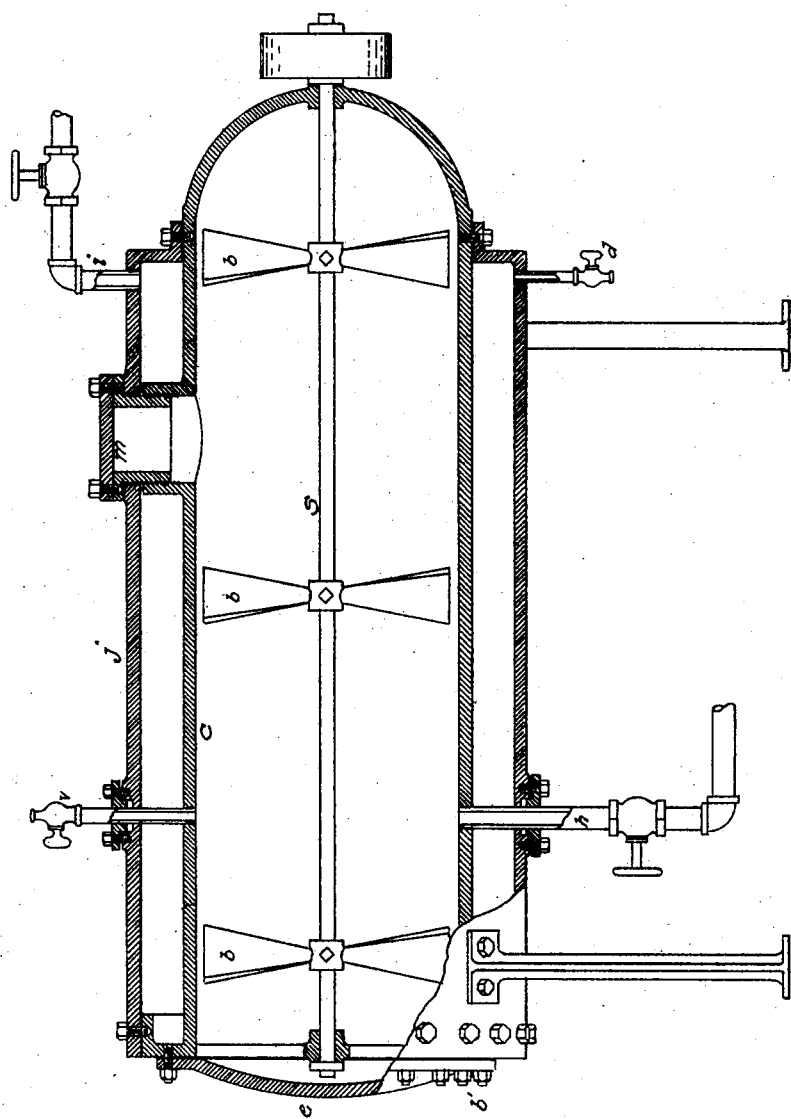
Witnesses:-
L. T. Petersen,
Inventor,
his Attorney.

No. 774,727.  
Patented November 8, 1904.

UNITED STATES PATENT OFFICE.

LUDWIG T. PETERSEN, OF AKRON, OHIO, ASSIGNOR TO HIMSELF AND JOHN F. McGUIRE, OF AKRON, OHIO.

PROCESS OF RECLAIMING AND REGENERATING RUBBER.

SPECIFICATION forming part of Letters Patent No. 774,727, dated November 8, 1904.

Application filed June 24, 1904. Serial No. 213,966. (No specimens.)

*To all whom it may concern:*

Be it known that I, LUDWIG T. PETERSEN, a citizen of the United States of America, and a resident of Akron, in the county of Summit and State of Ohio, have invented certain new and useful Improvements in Processes of Reclaiming and Regenerating Rubber, of which the following is a specification.

My invention relates to an improved process for reclaiming and regenerating rubber, and has for its object the devising of a method whereby worn rubber or ordinary rubber waste may be restored practically to its original condition and usefulness.

As is well known, rubber waste ordinarily consists of vulcanized rubber derived from numerous sources, with which is intimately associated more or less wool, cotton, or other fabric or fiber, which renders the same of little use except after such fabric has been removed or eliminated, while it is necessary to devulcanize the rubber for the purpose of milling it. Various processes have in the past been employed for accomplishing these results with more or less success, but without providing a practical commercial method for restoring the rubber substantially to its original condition for working and subsequent use. It has therefore been my purpose to accomplish this, avoiding in the course of the operation inherent defects present in treating rubber waste by other processes. Briefly alluding generally to these prior efforts, I may say that it has been found that any process depending upon dissolving the rubber or gum not only is impracticable, but is accompanied by the very serious defect of materially impairing the strength of the reclaimed rubber. Both acid and alkaline solutions have been employed for the purpose of devulcanizing the rubber and destroying or eliminating the fiber; but experience has shown that the high temperatures necessary to accomplish both of these results with such solutions cause a "burning" or hardening of the reclaimed rubber, which obviously impairs its quality and workable character. Hitherto it has been practically impossible to work reclaimed rubber except after the addition of a quantity of new rubber of a character adapted to soften the mixture and act as a flux to prevent the formation of lumps or blisters during the process of milling. Alkalies at the high temperatures requisite for devulcanizing, it has been authoritatively stated, saponify or destroy the caoutchoucine present in workable rubber, and my present process has been elaborated with the thought of effecting both the removal of the fabric or fiber as well as the devulcanization of the rubber waste without attacking this necessary oil in the body of the treated rubber.

Briefly outlining then my improved process, I may say that it first consists in subjecting the shredded or ground rubber waste to the action of an alkaline solution raised only to a boiling temperature, but preferably under considerable hydraulic pressure to insure permeation, whereby the contained fiber is converted into soluble form or cellulose hydrate. Removing the caustic solution and after this, or initially where the rubber waste chances to contain none of the undesirable fiber, the treated mass is subjected to an aqueous solution containing a relatively small percentage of hydrocarbon or oxyhydrocarbon, such as phenol, under conditions of high temperature and pressure, whereby any remaining alkali is combined, the rubber is devulcanized, and the resulting product is softened or rendered easily workable.

Details of my improved process will be better understood by referring to the succeeding description, which relates as well to the annexed drawing, illustrating by a longitudinal sectional view, partially broken away, mechanism well adapted for practicing the said process.

Referring first to said drawing, it will be seen that a double-walled cylinder equipped with the necessary steam and hydraulic connections for carrying on the process has been therein delineated. The inner cylinder $c$, wherein the rubber waste is treated, is constructed sufficiently heavy to withstand high pressures. Therein a longitudinal rotatable shaft $s$, armed with paddles or blades $b$, is provided, which parts are adapted to effect the thorough stirring of the contained solution and treated rubber. Surrounding this cylinder is provided the steam-jacket $j$, with which are connected the steam-inlet $i$ and the steam-drip $d$. Communicating with the interior chamber $c$ are the hydraulic inlet $h$ and the vent $v$, as well as the suitably-closed manhole $m$. The end portion $e$ of the cylinder is readily removable, being secured thereon against a gasket by the screw-bolts $b'$.

It will be understood that any suitable means for practicing my said process may be employed, since I have endeavored herein merely to indicate the preferred apparatus for accomplishing the desired results. It will also be clear that by reason of the varying grades and conditions of rubber waste no precise process applicable to all cases is capable of being explained, and the following accordingly may be considered as explanatory or typical merely of preferred methods.

The rubber waste after being ground or shredded is placed in the treating-chamber $c$, which contains in solution ten to fifteen per cent. of caustic soda. Steam is admitted to the jacket $j$ through the steam-pipe $i$ to raise the contents of the cylinder substantially to the boiling-point, and power being applied to the shaft the mixture is thoroughly stirred by the rotation of the blades $b$. Hydraulic pressure approximating two hundred pounds is applied to the interior of chamber $c$, thereby securing the thorough permeation of the rubber mass and its associated fabric by the caustic solution. This treatment ordinarily need not exceed three hours, which will insure the conversion of the fabric or fiber into cellulose hydrate. The treated rubber mass is then removed from the cylinder and placed in a centrifugal drier for the purpose of removing the soda solution, after which the rubber mass is once more introduced into the cylinder, together with a dilute solution of suitable hydrocarbon or oxyhydrocarbon soluble in water—as, for example, a one to ten per cent. solution of phenol. This solution, it is to be noted, should be sufficiently weak to prevent any solvent action upon the rubber, which would cause its deterioration and weaken the resulting product. A one-per-cent. solution of such hydrocarbon as phenol or creosote will ordinarily be sufficient for effecting the devulcanization and restoration of the rubber. Steam is once more admitted to the jacket $j$ sufficient to raise the contents of the cylinder to a temperature ranging from 300° to 375° Fahrenheit and insuring a pressure of approximately fifty to one hundred and seventy-five pounds. Depending partially upon the character of the rubber, but principally upon the amount of heat and pressure within the cylinder, this devulcanizing or restoring process or step is continued over a period of from six to forty-eight hours, after which the rubber mass is washed, dried, and milled for working in the usual manner.

The solution of phenol or other hydrocarbon acts initially to combine with any remaining caustic soda, which is negligible in quantity, and then to devulcanize the rubber, the phenol entering into the body thereof and improving its quality. At the same time the converted fiber or cellulose hydrate is readily dissolved from the rubber mass, thus leaving it practically in its original condition. It will be appreciated that the percentage of phenol or other suitable hydrocarbon in solution is kept low enough to avoid any solvent action thereby. In fact, for certain special cases I have found it desirable or advantageous to employ a solution containing twenty-five per cent. of phenol.

The caustic solution, used as it is under conditions of relatively low temperature, does not injuriously affect the treated rubber and may be employed again and again to convert the associated or contained fabric, as above explained, and take up the free sulfur, although this step naturally is not required where the treated rubber waste is free from fabric. Likewise it is not of sufficient strength to affect the pigments used in the rubber.

It will be found that the product of the process just described is soft and readily workable, requiring no admixture of new gum for the purpose of reworking said rubber. Indeed, it may be said that the rubber reclaimed by my improved process is restored substantially to its original state and may be used for most purposes in the place of new gum or caoutchouc.

In conclusion, I may point out that the said process possesses the marked advantage of being extremely cheap and economical to practice considered from the several standpoints of labor, cost of materials or reagents, the avoidance of long washings to remove the excess of caustic, and in the total time required.

Having now described a process embodying my improvements as preferably practiced by me, I claim as new, and desire to secure by Letters Patent, the following:

1. The process for devulcanizing rubber waste, which consists in treating shredded or finely-divided rubber, in a dilute solution of a hydrocarbon or oxyhydrocarbon soluble in water, under conditions of heat and pressure, represented by a temperature approximately of 300° to 375° Fahrenheit; said process being conducted in a closed vessel, and continued until devulcanization is effected, substantially as set forth.

2. The process for devulcanizing rubber waste, which consists in treating shredded or finely-divided rubber, in a dilute solution of phenol, under conditions of heat and pressure, represented by a temperature approximately of 300° to 375° Fahrenheit; said process being conducted in a closed vessel, and continued until devulcanization is effected, substantially as set forth.

3. The herein-described process for reclaiming and regenerating rubber, consisting of subjecting shredded or ground rubber waste to the action of a relatively weak alkaline solution, at a temperature not to exceed the boiling-point, but under conditions of high pressure, and thereafter subjecting the rubber waste to a dilute aqueous solution of a soluble hydrocarbon or oxyhydrocarbon, under conditions of relatively high temperature and pressure, substantially as described.

4. The herein-described process for reclaiming and regenerating rubber, consisting of subjecting ground rubber waste to the action of a ten to fifteen per cent. solution of caustic soda heated substantially to its boiling-point, subjecting the same meanwhile to hydraulic pressure approximating two hundred pounds, removing the soda solution, and subjecting the rubber waste to the action of a one to ten per cent. solution of phenol, heated in a closed vessel, approximately of 300° to 375° Fahrenheit, and effecting the solution of the fabric, substantially as set forth.

5. A process for reclaiming and regenerating rubber, involving the grinding of the rubber waste, heating the same in a solution of caustic soda, substantially to the boiling-point thereof, meanwhile subjecting the solution to high pressure, removing the soda solution from the rubber waste, subjecting the latter to the action of a hydrocarbon or oxyhydrocarbon, such as herein indicated, in an aqueous solution under conditions of a high degree of heat and pressure, whereby the converted fabric is dissolved out, and the rubber is devulcanized, substantially as described.

In testimony whereof I have signed my name, in the presence of two subscribing witnesses, at Cleveland, this 11th day of June, 1904.

LUDWIG T. PETERSEN.

Witnesses:
JOHN F. MCGUIRE,
ALBERT LYNN LAWRENCE.